(12) United States Patent
Koizumi

(10) Patent No.: US 11,977,866 B2
(45) Date of Patent: May 7, 2024

(54) APPLICATION SCREEN DISPLAY PROGRAM INSTALLING METHOD

(71) Applicant: HITACHI, LTD., Tokyo (JP)

(72) Inventor: Kiyoko Koizumi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 396 days.

(21) Appl. No.: 17/292,841

(22) PCT Filed: Sep. 3, 2019

(86) PCT No.: PCT/JP2019/034608
§ 371 (c)(1),
(2) Date: May 11, 2021

(87) PCT Pub. No.: WO2020/174727
PCT Pub. Date: Sep. 3, 2020

(65) Prior Publication Data
US 2021/0397419 A1 Dec. 23, 2021

(30) Foreign Application Priority Data
Feb. 26, 2019 (JP) ................. 2019-032204

(51) Int. Cl.
*G06F 8/38* (2018.01)
*G06F 9/451* (2018.01)
(52) U.S. Cl.
CPC .............. *G06F 8/38* (2013.01); *G06F 9/451* (2018.02)
(58) Field of Classification Search
CPC .................................. G06F 8/38; G06F 9/451
(Continued)

(56) References Cited

U.S. PATENT DOCUMENTS 8,042,063 B1 * 10/2011 Lin-Hendel ............ G06F 40/14
715/822
8,875,032 B2 * 10/2014 Olsen .................... G06F 40/103
715/825

(Continued)

FOREIGN PATENT DOCUMENTS

| JP | 2015-069247 A | 4/2015 |
| JP | 2017-120643 A | 7/2017 |
| JP | 2017-204100 A | 11/2017 |

OTHER PUBLICATIONS

Alanazi et al, "Configuring the Webpage Content through Conditional Constraints and Preferences", 2014, [Online], pp. 436-445, [Retrieved from internet on Dec. 19, 2023], <chrome-extension://efaidnbmnnnibpcajpcglclefindmkaj/https://www.researchgate.net/profile/Eisa-Alanazi/publication/299847096_Conf> (Year: 2014).*

(Continued)

*Primary Examiner* — S. Sough
*Assistant Examiner* — Zengpu Wei
(74) *Attorney, Agent, or Firm* — Volpe Koenig

(57) ABSTRACT

There is provided an application screen display program implementation method for executing application software to display a screen using an information processing apparatus. Each record of a master table for controlling the display of each display element for display elements configuring a screen and transaction data input and output from the display element has a field for holding an index of an array, and association with an index of an array in a source code of an execution program is performed. Therefore, in application development, the required man-hours with respect to the change of the display screen are reduced.

6 Claims, 22 Drawing Sheets

(58) Field of Classification Search
USPC .......................................................... 717/100
See application file for complete search history.

(56) References Cited

U.S. PATENT DOCUMENTS

| | | | | |
|---|---|---|---|---|
| 10,606,452 | B2* | 3/2020 | Lin-Hendel | G06F 16/9535 |
| 2010/0275155 | A1* | 10/2010 | Kawashima | G06F 9/451 |
| | | | | 715/802 |
| 2015/0278190 | A1* | 10/2015 | Ohara | H04L 67/10 |
| | | | | 704/10 |
| 2016/0259717 | A1* | 9/2016 | Nychis | G06F 9/455 |
| 2021/0271355 | A1* | 9/2021 | Masuda | G06F 8/38 |

OTHER PUBLICATIONS

International Search Report, PCT/JP2019/034608, dated Nov. 19, 2019 (2 pg.).

* cited by examiner

SOFTWARE HIERARCHY

| LARGE HEADING No. | SMALL HEADING No. | ITEM COLUMN No. |
|---|---|---|
| 1 | 0 | 0 |
| 1 | 1 | 0 |

| LARGE HEADING 1 | SMALL HEADING 11 | TEXT AREA 1 |
|---|---|---|
| | SMALL HEADING 12 | ☐ CHECK BOX 1<br>☐ CHECK BOX 2<br>☐ CHECK BOX 3 |
| | SMALL HEADING 13 | LIST BOXES 1 - 2 ▽ |
| LARGE HEADING 2 | SMALL HEADING 21 | LIST BOXES 3 - 4 ▽ |
| | SMALL HEADING 22 | ○ RADIO BUTTON 1   ○ RADIO BUTTON 2 |

FIG. 6

| LARGE HEADING | SMALL HEADING | ITEM COLUMN | TABLE EXPRESSION |
|---|---|---|---|
| LARGE HEADING 1 | | | (1, 0, 0) |
| | SMALL HEADING 11 | | (1, 1, 0) |
| | | TEXT AREA 1 | (1, 1, 1) |
| | SMALL HEADING 12 | | (1, 2, 0) |
| | | CHECK BOX 1 | (1, 2, 2) |
| | | CHECK BOX 2 | (1, 2, 2) |
| | | CHECK BOX 3 | (1, 2, 2) |
| | SMALL HEADING 13 | | (1, 3, 0) |
| | | LIST BOX 1 | (1, 3, 3) |
| | | LIST BOX 2 | (1, 3, 3) |
| LARGE HEADING 2 | | | (2, 1, 0) |
| | SMALL HEADING 21 | | (2, 1, 1) |
| | | LIST BOX 1 | (2, 1, 3) |
| | | LIST BOX 2 | (2, 1, 3) |
| | SMALL HEADING 22 | | (2, 2, 0) |
| | | RADIO BUTTON 1 | (2, 2, 4) |
| | | RADIO BUTTON 2 | (2, 2, 4) |

FIG. 7

DISPLAY CONTROL MASTER TABLE 210

| ATTRIBUTE | LARGE HEADING No. | SMALL HEADING No. | ITEM COLUMN No. | EFFECTIVE START DATE | EFFECTIVE END DATE | No. OF COLUMNS | No. OF ROWS | PRESENCE OR ABSENCE OF DISPLAY |
|---|---|---|---|---|---|---|---|---|
| Table | 1 | 0 | 0 | 20180401 | 20180930 |   |   | Y |
| Tr | 1 | 1 | 0 | 20180401 | 20180930 | 1 |   | Y |
| Th | 1 | 0 | 0 | 20180401 | 20180930 | 1 | 3 | Y |
| Th | 1 | 1 | 0 | 20180401 | 20180930 | 1 |   | Y |
| Td | 1 | 1 | 1 | 20180401 | 20180930 | 1 |   | Y |
| Td | 1 | 1 | 2 | 20180401 | 20180930 | 1 |   | N |
| Td | 1 | 1 | 3 | 20180401 | 20180930 | 1 |   | N |
| Td | 1 | 1 | 4 | 20180401 | 20180930 |   |   | N |
| Tr | 1 | 2 | 0 | 20180401 | 20180930 | 1 |   | Y |
| Th | 1 | 2 | 0 | 20180401 | 20180930 | 1 |   | Y |
| Td | 1 | 2 | 1 | 20180401 | 20180930 | 1 |   | N |
| Td | 1 | 2 | 2 | 20180401 | 20180930 | 1 |   | Y |
| Td | 1 | 2 | 3 | 20180401 | 20180930 | 1 |   | N |
| Td | 1 | 2 | 4 | 20180401 | 20180930 | 1 |   | N |
| Tr | 1 | 3 | 0 | 20180401 | 20180930 | 1 |   | Y |
| Th | 1 | 3 | 0 | 20180401 | 20180930 | 1 |   | Y |
| Td | 1 | 3 | 1 | 20180401 | 20180930 | 1 |   | N |
| Td | 1 | 3 | 2 | 20180401 | 20180930 | 1 |   | N |
| Td | 1 | 3 | 3 | 20180401 | 20180930 | 1 |   | Y |
| Td | 1 | 3 | 4 | 20180401 | 20180930 | 1 |   | N |
| Table | 2 | 0 | 0 | 20180401 | 20180930 |   |   | Y |
| Tr | 2 | 1 | 0 | 20180401 | 20180930 | 1 |   | Y |
| Th | 2 | 0 | 0 | 20180401 | 20180930 | 1 | 2 | Y |
| Th | 2 | 1 | 0 | 20180401 | 20180930 | 1 |   | Y |
| Td | 2 | 1 | 1 | 20180401 | 20180930 | 1 |   | N |
| Td | 2 | 1 | 2 | 20180401 | 20180930 | 1 |   | N |
| Td | 2 | 1 | 3 | 20180401 | 20180930 | 1 |   | Y |
| Td | 2 | 1 | 4 | 20180401 | 20180930 |   |   | N |
| Tr | 2 | 2 | 0 | 20180401 | 20180930 | 1 |   | Y |
| Th | 2 | 2 | 0 | 20180401 | 20180930 | 1 |   | Y |
| Td | 2 | 2 | 1 | 20180401 | 20180930 | 1 |   | N |
| Td | 2 | 2 | 2 | 20180401 | 20180930 | 1 |   | N |
| Td | 2 | 2 | 3 | 20180401 | 20180930 | 1 |   | N |
| Td | 2 | 2 | 4 | 20180401 | 20180930 | 1 |   | Y |
| Tr | 2 | 3 | 0 | 20180401 | 20180930 | 1 |   | N |
| Th | 2 | 3 | 0 | 20180401 | 20180930 | 1 |   | N |
| Td | 2 | 3 | 1 | 20180401 | 20180930 | 1 |   | N |
| Td | 1 | 3 | 2 | 20180401 | 20180930 | 1 |   | N |
| Td | 1 | 3 | 3 | 20180401 | 20180930 | 1 |   | N |
| Td | 1 | 3 | 4 | 20180401 | 20180930 | 1 |   | N |

FIG. 8

TERM CONTROL MASTER TABLE    220

| 220a | 220b | 220c | 220d | 220e | 220f | 220g | 220h | 220i |
|---|---|---|---|---|---|---|---|---|
| TYPE | LARGE HEADING No. | SMALL HEADING No. | ITEM COLUMN No. | EFFECTIVE START DATE | EFFECTIVE END DATE | OPTION CODE | SELECTION | DISPLAY CHARACTER |
| EN | 1 | 0 | 0 | 20180401 | 20180930 | | | LARGE HEADING 1 |
| EN | 1 | 1 | 0 | 20180401 | 20180930 | | | SMALL HEADING 11 |
| EN | 1 | 2 | 0 | 20180401 | 20180930 | | | SMALL HEADING 12 |
| EN | 1 | 3 | 0 | 20180401 | 20180930 | | | SMALL HEADING 13 |
| EN | 1 | 1 | 1 | 20180401 | 20180930 | | | TEXT AREA 1 |
| CB | 1 | 2 | 2 | 20180401 | 20180930 | 1 | | CHECK BOX 1 |
| CB | 1 | 2 | 2 | 20180401 | 20180930 | 2 | | CHECK BOX 2 |
| CB | 1 | 2 | 2 | 20180401 | 20180930 | 3 | | CHECK BOX 3 |
| PL | 1 | 3 | 3 | 20180401 | 20180930 | 1 | Y | |
| PL | 1 | 3 | 3 | 20180401 | 20180930 | 2 | | LIST BOX 1 |
| PL | 1 | 3 | 3 | 20180401 | 20180930 | 3 | | LIST BOX 2 |
| En | 2 | 0 | 0 | 20180401 | 20180930 | 1 | | LARGE HEADING 2 |
| En | 2 | 1 | 0 | 20180401 | 20180930 | 1 | | SMALL HEADING 21 |
| En | 2 | 2 | 0 | 20180401 | 20180930 | 1 | | SMALL HEADING 22 |
| PL | 2 | 1 | 3 | 20180401 | 20180930 | 1 | Y | |
| PL | 2 | 1 | 3 | 20180401 | 20180930 | 2 | | LIST BOX 3 |
| PL | 2 | 1 | 3 | 20180401 | 20180930 | 3 | | LIST BOX 4 |
| RD | 2 | 2 | 4 | 20180401 | 20180930 | 1 | | RADIO BUTTON 2 |
| RD | 2 | 2 | 4 | 20180401 | 20180930 | 2 | | RADIO BUTTON 2 |

FIG. 9

TRANSACTION DATA 230

| 230a | 230b | 230c | 230d | 230e | 230f | 230g |
|---|---|---|---|---|---|---|
| RECEPTION ID | DRAFTING DATE | LARGE HEADING No. | SMALL HEADING No. | ITEM COLUMN No. | TYPE | REGISTERED VALUE |
| 001 | 20180503 | 1 | 1 | 1 | EN | XX SERVICE |
| 001 | 20180430 | 1 | 2 | 2 | CB | 1 |
| 001 | 20180722 | 1 | 3 | 3 | PL | 001 |
| 001 | 20180815 | 2 | 1 | 3 | PL | 003 |
| 001 | 20180724 | 2 | 2 | 4 | RD | 1 |

FIG. 10

```
                                                                        SC01
//STORE DISPLAY NECESSITY OF DISPLAY CONTROL MASTER IN ARRAY
for(DISPLAY CONTROL MASTER:DISPLAY CONTROL MASTER LIST)
{                                                                    ⎫
 x = LARGE HEADING No.;                                              ⎪ SC01a
 y = SMALL HEADING No.;                                              ⎬
 z = ITEM COLUMN No.;                                                ⎪
 DISPLAY [x][y][z] = DISPLAY CONTROL MASTER.DISPLAY NECESSITY;       ⎭
}

//STORE TYPE, OPTION CODE, AND DISPLAY CHARACTER
// OF TERM CONTROL MASTER IN ARRAY
//IN CASE OF TYPE = 'EN' (TEXT AREA)
for(TERM CONTROL MASTER: TERM CONTROL MASTER LIST)                      SC01b
{
 x = LARGE HEADING No.;
 y = SMALL HEADING No.;
 z = ITEM COLUMN No.;
 TYPE[x][y][z] = TERM CONTROL MASTER.TYPE;
 TERM[x][y][z] = TERM CONTROL MASTER.DISPLAY CHARACTER;
}
                                                                        SC01c
//IN CASE OF TYPE = 'PL'(LIST BOX)、'CB'(CHECK BOX)
 for(TERM CONTROL MASTER: TERM CONTROL MASTER LIST)
{
 x = LARGE HEADING No.;
 y = SMALL HEADING No.;
 z = ITEM COLUMN No.;
 TYPE[x][y][z] = TERM CONTROL MASTER.TYPE;
 TERM[x][y][z] = TERM CONTROL MASTER.DISPLAY CHARACTER;
//getPropertyCode IS FUNCTION TO OBTAIN PROPERTY CODE FROM LARGE HEADING No.,
//SMALL HEADING No., AND ITEM COLUMN No.
 PROPERTY[x][y][z] = getPropetyCode(LARGE HEADINGNo, SMALL HEADINGNo, ITEM
COLUMNNo);
}
```

FIG. 11

```
//[AT TIME OF SCREEN DISPLAY]STORE CONTENTS OF TRANSACTION         ⎤ SC02a
//DATA IN ARRAY                                                     |
for(int i = 0;i<Pjd5dt102.size;++i){                                |
  x = LARGE HEADING No.;                                            |
  y = SMALL HEADING No.;                                            |
  z = ITEM COLUMN No.;                                              |
  if("CB".equals(TRDB.TYPE){                                        |
    INPUT AND OUTPUT [x][y][z] = "checked"                          |
  }                                                                 |
  else{                                                             |
    INPUT AND OUTPUT [x][y][z] = TRDB. REGISTERED VALUE             |
}                                                                   ⎦

//[AT TIME OF SCREEN UPDATE] STORE CONTENTS OF ARRAY IN            ⎤ SC02b
//TRANSACTION DATA                                                  |
for (int x = 0;x<iodNoCopy.length;++x){                             |
  for(int y = 0;y<iodNoCopy[x].length;++y) {                        |
    for(int z = 0;z<iodNoCopy[x][y].length;++z){                    |
      if(iodNoCopy[x][y][z]1 = null) {                              |
        TRDB.LARGE HEADING  No. = (short)x;                         |
        TRDB.SMALL HEADING  No.= (short)y;                          |
        TRDB.ITEM COLUMN  No.= (short)z;                            |
        TRDB. REGISTERED VALUE TRDB.TYPE;                           |
        insert(DB);                                                 |
    }                                                               |
  }                                                                 |
 }                                                                  |
}                                                                   ⎦
```

```
                                                                    SC03
<table style = ${DISPLAY[1][0][0]}>  ─────────────────────── SC03a <tr style = ${DISPLAY[1][0][0]}>  ─────────────────────────
<th rowspan = "03"><label>$ {TERM[1][0][0]}</label></th>           SC03b
<th><label>${TERM[1][1][0]}</label></th>
<td><html:text property = "INPUT AND OUTPUT[1][1][1] " value = "${INPUT AND ⎫
OUTPUT[1][1][1]}/>                                                  ⎬ SC03c
 <input type = "hidden"  name = "TYPE[1][1][1]" value = "${TYPE[1][1][1]}"> × /td> ⎭
</tr>

<tr style = ${DISPLAY[1][0][0]}>
<th><label>${TERM[1][2][0]}</label></th>                            SC03d
<td><%list = (List<TERM MASTER MODEL>)map1.get("001002001");%>     ⎫
 <%request.setAttribute("list", list);%>                            ⎪
 <html:select property = "PROPERTY[1][2][1]" value = "${INPUT AND OUTPUT[1][2][1]}/> ⎬
 <html:options collection = "list" property = " OPTION CODE " labelProperty = "DISPLAY ⎪
CHARACTEER"/></html:select>                                         ⎪
<html:hidden property = "ATTRIBUTE[1][2][1]" value = "${ATTRIBUTE[1][2][1]} "/></td> ⎭
</tr>

<tr style = ${DISPLAY[1][3][0]}>
<th><label>${TERM[1][3][0]}</label></th>
<td><% list = (List<TERM MASTER MODEL>)map1.get("001003001"); %>
 <%for(int i = 0;i<list.slze(); ++i){ %>                            SC03e
 <% TERM MASTER MODEL leaf = (TERM MASTER MODEL)list.get(i); %>    ⎫
 <% request.setAttribute("leaf", leaf); %>                          ⎪
 <% request.setAttribute("cunt", i) %>                              ⎪
 <jnput type = "checkbox" name = "PROPERTY[1][3][% = i %>]" value = "<% = i %>" $INPUT AND ⎬
OUTPUT[1][3][cunt]}/>                                               ⎪
 <bean:write name = "leaf" property = "DISPLAY文字" "scope = "request"/> ⎭
 <inputtype = "hldden"name = "TYPE[1][3][<% = i %> value = "${ATTRIBUTE[1][3][cunt]}">
 <% } %></td>
</tr>
```

FIG. 13

DISPLAY CONTROL MASTER TABLE 210

| ATTRIB-UTE | LARGE HEADING No. | SMALL HEADING No. | ITEM COLUMN No. | EFFECTIVE START DATE | EFFECTIVE END DATE | No. OF COLUMNS | No. OF ROWS | PRESENCE OR ABSENCE OF DISPLAY |
|---|---|---|---|---|---|---|---|---|
| Table | 1 | 0 | 0 | 20181001 | 20190331 |  |  | Y |
| Tr | 1 | 1 | 0 | 20181001 | 20190331 | 1 |  | Y |
| Th | 1 | 0 | 0 | 20181001 | 20190331 | 1 | 3 | Y |
| Th | 1 | 1 | 0 | 20181001 | 20190331 | 1 |  | Y |
| Td | 1 | 1 | 1 | 20181001 | 20190331 | 1 |  | Y |
| Td | 1 | 1 | 2 | 20181001 | 20190331 | 1 |  | N |
| Td | 1 | 1 | 3 | 20181001 | 20190331 | 1 |  | N |
| Td | 1 | 1 | 4 | 20181001 | 20190331 |  |  | N |
| Tr | 1 | 2 | 0 | 20181001 | 20190331 | 1 |  | Y |
| Th | 1 | 2 | 0 | 20181001 | 20190331 | 1 |  | Y |
| Td | 1 | 2 | 1 | 20181001 | 20190331 | 1 |  | N |
| Td | 1 | 2 | 2 | 20181001 | 20190331 | 1 |  | Y |
| Td | 1 | 2 | 3 | 20181001 | 20190331 | 1 |  | N |
| Td | 1 | 2 | 4 | 20181001 | 20190331 | 1 |  | N |
| Tr | 1 | 3 | 0 | 20181001 | 20190331 | 1 |  | Y |
| Th | 1 | 3 | 0 | 20181001 | 20190331 | 1 |  | Y |
| Td | 1 | 3 | 1 | 20181001 | 20190331 | 1 |  | N |
| Td | 1 | 3 | 2 | 20181001 | 20190331 | 1 |  | N |
| Td | 1 | 3 | 3 | 20181001 | 20190331 | 1 |  | Y |
| Td | 1 | 3 | 4 | 20181001 | 20190331 | 1 |  | N |
| Table | 2 | 0 | 0 | 20181001 | 20190331 |  |  | Y |
| Tr | 2 | 1 | 0 | 20181001 | 20190331 | 1 |  | Y |
| Th | 2 | 0 | 0 | 20181001 | 20190331 | 1 | 1 | Y |
| Th | 2 | 1 | 0 | 20181001 | 20190331 | 1 |  | Y |
| Td | 2 | 1 | 1 | 20181001 | 20190331 | 1 |  | N |
| Td | 2 | 1 | 2 | 20181001 | 20190331 | 1 |  | N |
| Td | 2 | 1 | 3 | 20181001 | 20190331 | 1 |  | N |
| Td | 2 | 1 | 4 | 20181001 | 20190331 |  |  | N |
| Tr | 2 | 2 | 0 | 20181001 | 20190331 | 1 |  | N |
| Th | 2 | 2 | 0 | 20181001 | 20190331 | 1 |  | N |
| Td | 2 | 2 | 1 | 20181001 | 20190331 | 1 |  | N |
| Td | 2 | 2 | 2 | 20181001 | 20190331 | 1 |  | N |
| Td | 2 | 2 | 3 | 20181001 | 20190331 | 1 |  | N |
| Td | 2 | 2 | 4 | 20181001 | 20190331 | 1 |  | N |
| Tr | 2 | 3 | 0 | 20181001 | 20190331 | 1 |  | N |
| Th | 2 | 3 | 0 | 20181001 | 20190331 | 1 |  | N |
| Td | 2 | 3 | 1 | 20181001 | 20190331 | 1 |  | N |
| Td | 1 | 3 | 2 | 20181001 | 20190331 | 1 |  | N |
| Td | 1 | 3 | 3 | 20181001 | 20190331 | 1 |  | N |
| Td | 1 | 3 | 4 | 20181001 | 20190331 | 1 |  | N |

FIG. 14

TERM CONTROL MASTER TABLE 220

| 220a | 220b | 220c | 220d | 220e | 220f | 220g | 220h | 220i |
|---|---|---|---|---|---|---|---|---|
| TYPE | LARGE HEADING No. | SMALL HEADING No. | ITEM COLUMN No. | EFFECTIVE START DATE | EFFECTIVE END DATE | OPTION CODE | SELECTION | DISPLAY CHARACTER |
| EN | 1 | 0 | 0 | 20181001 | 20190331 | | | HEADING 1 |
| EN | 1 | 1 | 0 | 20181001 | 20190331 | | | SMALL HEADING 1 |
| EN | 1 | 2 | 0 | 20181001 | 20190331 | | | SMALL HEADING 2 |
| EN | 1 | 3 | 0 | 20181001 | 20190331 | | | SMALL HEADING 3 |
| EN | 1 | 1 | 1 | 20181001 | 20190331 | | | TEXT AREA 1 |
| CB | 1 | 2 | 2 | 20181001 | 20190331 | 1 | | CHECK BOX 1 |
| CB | 1 | 2 | 2 | 20181001 | 20190331 | 2 | | CHECK BOX 2 |
| CB | 1 | 2 | 2 | 20181001 | 20190331 | 3 | | CHECK BOX 3 |
| CB | 1 | 2 | 2 | 20181001 | 20190331 | 4 | | CHECK BOX 4 |
| PL | 1 | 3 | 3 | 20181001 | 20190331 | 1 | Y | |
| PL | 1 | 3 | 3 | 20181001 | 20190331 | 2 | | LIST BOX 1 |
| PL | 1 | 3 | 3 | 20181001 | 20190331 | 3 | | LIST BOX 2 |
| PL | 1 | 3 | 3 | 20181001 | 20190331 | 4 | | LIST BOX 3 |
| En | 2 | 0 | 0 | 20181001 | 20190331 | 1 | | HEADING 2 |
| En | 2 | 1 | 0 | 20181001 | 20190331 | 1 | | SMALL HEADING 1 |
| RD | 2 | 1 | 4 | 20181001 | 20190331 | 1 | | RADIO BUTTON 1 |
| RD | 2 | 1 | 4 | 20181001 | 20190331 | 2 | | RADIO BUTTON 2 |

FIG. 15

TRANSACTION DATA     230

| RECEPTION ID | DRAFTING DATE | LARGE HEADING No. | SMALL HEADING No. | ITEM COLUMN No. | TYPE | REGISTERED VALUE |
|---|---|---|---|---|---|---|
| 004 | 20181001 | 1 | 1 | 1 | EN | YY SERVICE |
| 004 | 20181024 | 1 | 2 | 2 | CB | 2 |
| 004 | 20190130 | 1 | 3 | 3 | PL | 003 |
| 004 | 20180204 | 2 | 2 | 4 | RD | 2 |

| HEADING 1 | SMALL HEADING 1 | TEXT AREA 1 |
| --- | --- | --- |
| | SMALL HEADING 2 | ☐ CHECK BOX 1<br>☐ CHECK BOX 2<br>☐ CHECK BOX 3 |
| | SMALL HEADING 13 | LIST BOX 1 - 3 ▽ |
| HEADING 2 | SMALL HEADING 22 | ○ RADIO BUTTON 1  ○ RADIO BUTTON 2 |

FIG. 17

TERM CONTROL MASTER TABLE    220

| 220a | 220b | 220c | 220d | 220e | 220f | 220g | 220h | 220i |
|---|---|---|---|---|---|---|---|---|
| TYPE | LARGE HEADING No. | SMALL HEADING No. | ITEM COLUMN No. | EFFECTIVE START DATE | EFFECTIVE END DATE | OPTION CODE | SELECTION | DISPLAY CHARACTER |
| CB | 1 | 2 | 1 | 20180930 | 20180930 | 1 | | LOQUAT |
| CB | 1 | 2 | 2 | 20180930 | 20180930 | 2 | | CHERRY |
| CB | 1 | 2 | 3 | 20180930 | 20180930 | 3 | | PEAR |
| CB | 1 | 3 | 1 | 20180930 | 20180930 | 1 | | CARAMEL |
| CB | 1 | 3 | 2 | 20180930 | 20180930 | 2 | | CHOCOLATE |

FIG. 18

TERM CONTROL MASTER TABLE 220

| TYPE | LARGE HEADING No. | SMALL HEADING No. | ITEM COLUMN No. | EFFECTIVE START DATE | EFFECTIVE END DATE | OPTION CODE | SELECTION | DISPLAY CHARACTER |
|---|---|---|---|---|---|---|---|---|
| CB | 1 | 2 | 1 | 20180301 | 20180930 | 1 | | LOQUAT |
| CB | 1 | 2 | 2 | 20180301 | 20180930 | 2 | | CHERRY |
| CB | 1 | 2 | 3 | 20180301 | 20180930 | 3 | | PEAR |
| CB | 1 | 3 | 1 | 20180301 | 20180930 | 1 | | CARAMEL |
| CB | 1 | 3 | 2 | 20180301 | 20180930 | 2 | | CHOCOLATE |
| CB | 1 | 2 | 1 | 20181001 | 20190331 | 1 | | TANGERINE |
| CB | 1 | 2 | 2 | 20181001 | 20190331 | 2 | | STRAWBERRY |
| CB | 1 | 3 | 1 | 20181001 | 20190331 | 1 | | CARAMEL |
| CB | 1 | 3 | 2 | 20181001 | 20190331 | 2 | | CHOCOLATE |
| CB | 1 | 3 | 3 | 20181001 | 20190331 | 3 | | POTATO CHIP |
| CB | 1 | 3 | 4 | 20181001 | 20190331 | 4 | | COOKIE |

| HEADING 1 | SMALL HEADING 2 | ☐ LOQUAT<br>☐ CHERRY<br>☐ PEAR |
|---|---|---|
| | SMALL HEADING 3 | ☐ CARAMEL<br>☐ CHOCOLATE |

FIG. 20

| HEADING 1 | SMALL HEADING 2 | ☐ TANGERINE<br>☐ STRAWBERRY |
| --- | --- | --- |
| | SMALL HEADING 3 | ☐ CARAMEL<br>☐ CHOCOLATE<br>☐ POTATO CHIP<br>☐ COOKIE |

```
<%-- list : VARIABLE TO EXTRACT AND STORE CORRESPONDING CHECK BOX
INFORMATION FROM MAP  --%>
<%-- leaf : VARIABLE TO EXTRACT AND STORE CHECK BOX INFORMATION
FROM list FOR EACH CASE --%>
<%-- cbck : VARIABLE IN WHICH CHECK PRESENCE/ABSENCE INFORMATION IS
STORED --%>
<% list = (List<checkBoxModel>)map1.get("001002002");  %>
<td>
<% for (int i = 0; i < list.size(); ++i) { %>
<% checkBoxModel leaf = (checkBoxModel)list.get(i);%>
<% request.setAttribute("leaf", leaf);  %>
<% request.setAttribute("count", i   ); %>
<input type="checkbox" name="cb[1][2][<%= i %>]" value="<%= i %>"
${f.cbck[1][2][count]}/>
<bean:write name="leaf" property="msg" scope="request" /><br>
<% } %>
</td>
```

SC04a

APPLICATION SCREEN DISPLAY PROGRAM INSTALLING METHOD

TECHNICAL FIELD

The present invention relates to an application screen display program implementation method, and in particular, to an application screen display program implementation method suitable for reducing the required development man-hours with respect to the change of a display screen in Web application development.

BACKGROUND ART

In recent years, due to the explosive spread of the Internet, programming engineers are often required to develop Web application software.

In particular, the development of a screen displayed on the Web browser is often carried out by trial and error, and it is also necessary to change the source code that defines the input and output operations according to the change of screen specifications. The current situation is that a large amount of man-hours are required because the description of the source code for that purpose and the test process for that purpose are required.

For example, Patent Document 1 discloses a technique for efficiently displaying task contents on a panel, displaying their relationships for a user, and optimally arranging the task contents on a screen using an information processing apparatus.

CITATION LIST

Patent Document

Patent Document 1: JP 2017-204100 A

SUMMARY OF THE INVENTION

Problems to be Solved by the Invention

In the system described in Patent Document 1, a designated panel is highlighted, and a panel associated with the panel is also highlighted in a different manner. In this system, in order to change the layout or display items of each panel, the application software should be rewritten. For this reason, it is expected that a large amount of man-hours will be required for modifying, testing, or debugging the source code.

It is an object of the present invention to provide an application screen display program implementation method capable of reducing the required development man-hours with respect to the development and change of the display screen in application development.

Solutions to Problems

The configuration of an application screen display program implementation method of the present invention is preferably an application screen display program implementation method for executing application software to display a screen using an information processing apparatus. The application screen display program implementation method includes: holding a master table for controlling display of each display element for display elements configuring the screen; holding information regarding a variable in a source code of an execution program, which is associated with control of the display of the display element, by each record of the master table for controlling the display of the display element; and holding information regarding a variable in a source code of an execution program, which is associated with the display element, by each record of transaction data input and output from the display element.

More specifically, each record of the master table for controlling the display of the display element and the transaction data input and output from the display element has a field for holding an index of an array, and association with an index of an array in a source code of an execution program is performed.

Effects of the Invention

According to the present invention, it is possible to provide an application screen display program implementation method capable of reducing the required development man-hours with respect to the development and change of the display screen in application development.

BRIEF DESCRIPTION OF THE DRAWINGS

FIG. 5 is a diagram describing the screen layout of a display screen (first one).

FIG. 6 is a diagram describing a relationship between display elements and data.

FIG. 7 is a diagram showing an example of a display control master table (first one).

FIG. 8 is a diagram showing an example of a term control master table (first one).

FIG. 9 is a diagram showing an example of transaction data (first one).

FIG. 10 is a diagram showing an example of a source code in which logic relevant to display is described.

FIG. 11 is a diagram showing an example of a source code in which logic relevant to data is described.

FIG. 12 is a diagram showing an example of a source code representing screen data (first one).

FIG. 13 is a diagram showing an example of a display control master table (second one).

FIG. 14 is a diagram showing an example of a term control master table (second one).

FIG. 15 is a diagram showing an example of transaction data (second one).

FIG. 16 is a diagram describing the screen layout of a display screen (second one).

FIG. 17 is a diagram showing an example of a term control master table (third one).

FIG. 18 is a diagram showing an example of a term control master table (fourth one).

FIG. 19 is a diagram describing the screen layout of a display screen (third one).

FIG. 20 is a diagram describing the screen layout of a display screen (fourth one).

FIG. 21 is a diagram showing an example of a source code representing screen data (second one).

MODE FOR CARRYING OUT THE INVENTION

Hereinafter, each embodiment of the present invention will be described with reference to FIGS. 1 to 21.

First Embodiment

Hereinafter, an application screen display program implementation method according to a first embodiment of the present invention will be described with reference to FIGS. 1 to 12.

First, the configuration of a Web system according to the first embodiment will be described with reference to FIGS. 1 and 2.

Figure 1:
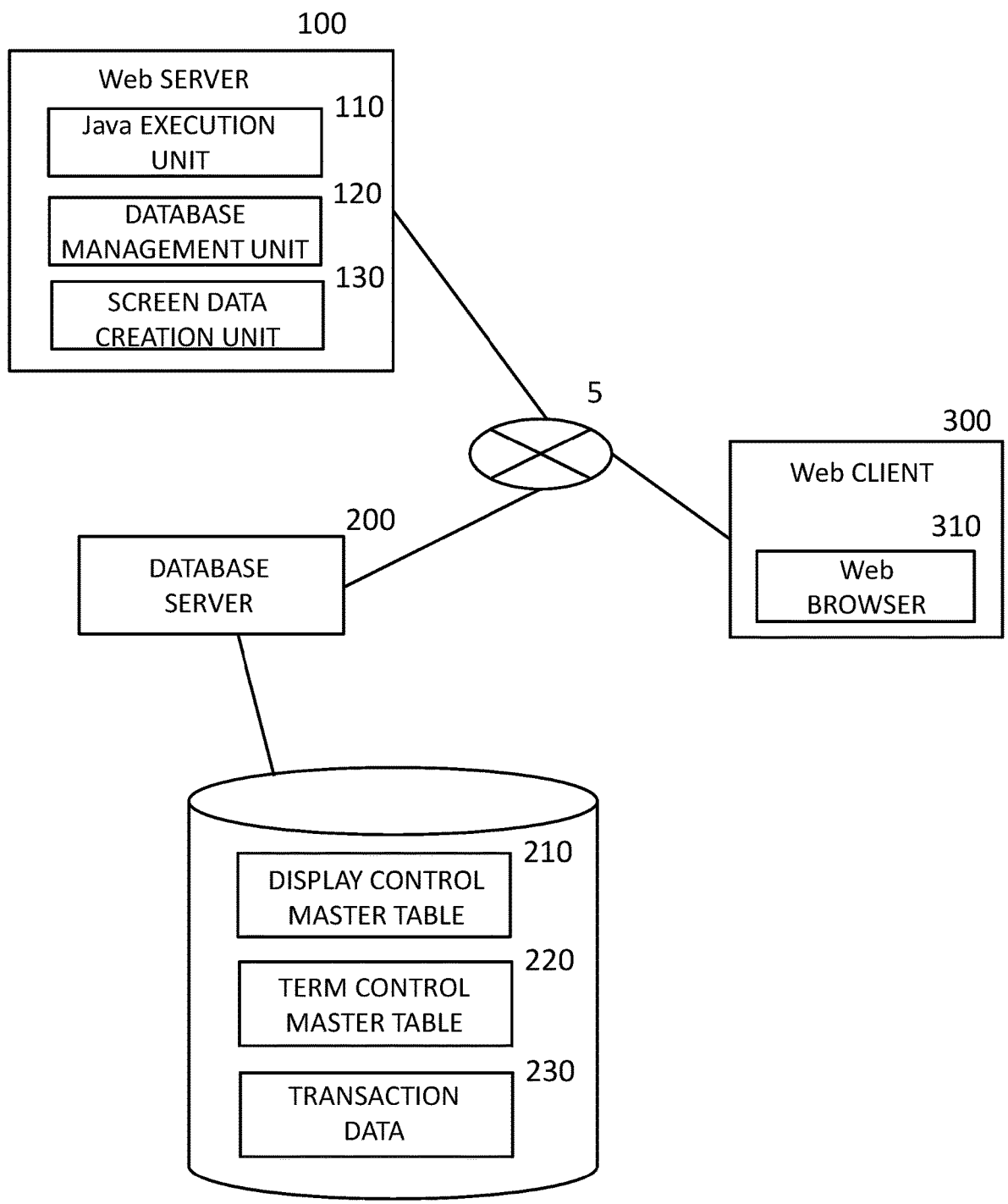
FIG. 1 is a diagram showing the overall configuration of a Web system.

As shown in FIG. 1, the Web system according to the first embodiment has a form in which a Web server 100, a Web client 300, and a database server 200 are connected to each other by a network 5.

The Web server 100 is a server that distributes a Hypertext Markup Language (HTML) document to the Web client 300 and executes a server-side program. The Web client 300 is an information processing apparatus that receives an input of a command or data from a user, receives an HTML document from a Web server, and displays a screen on a Web browser 310. The database server 200 is a server that manages a database and provides data input and output services.

In the present embodiment, an application screen display program implementation method when the server-side application program is described in JAVA (registered trademark) and JavaSever Pages (JSP), which are known program languages, and the screen data is described in an HTML language will be described. In addition, the JSP is a technique for embedding a code described in the JAVA language in an HTML document.

The Web server 100 includes functional units of a JAVA execution unit 110, a database management unit 120, and a screen data creation unit 130. The JAVA execution unit 110 is a functional unit that executes a program described in JAVA. The database management unit 120 is a functional unit that accesses a table and transaction data stored in a database through a database server and processes the data and inputs and output the data. The screen data creation unit 130 is a functional unit that creates screen data to be displayed on the Web client 300. The database server 200 is a server that manages a database and provides a service to access. The database server 200 holds a display control master table 210, a term control master table 220, and transaction data 230. The details of each table and data will be described later.

The network 5 may be a global network, such as the Internet or a Local NetWork (LAN).

Next, the details of the hardware and software configurations of the Web server will be described with reference to FIG. 2.

Figure 2:
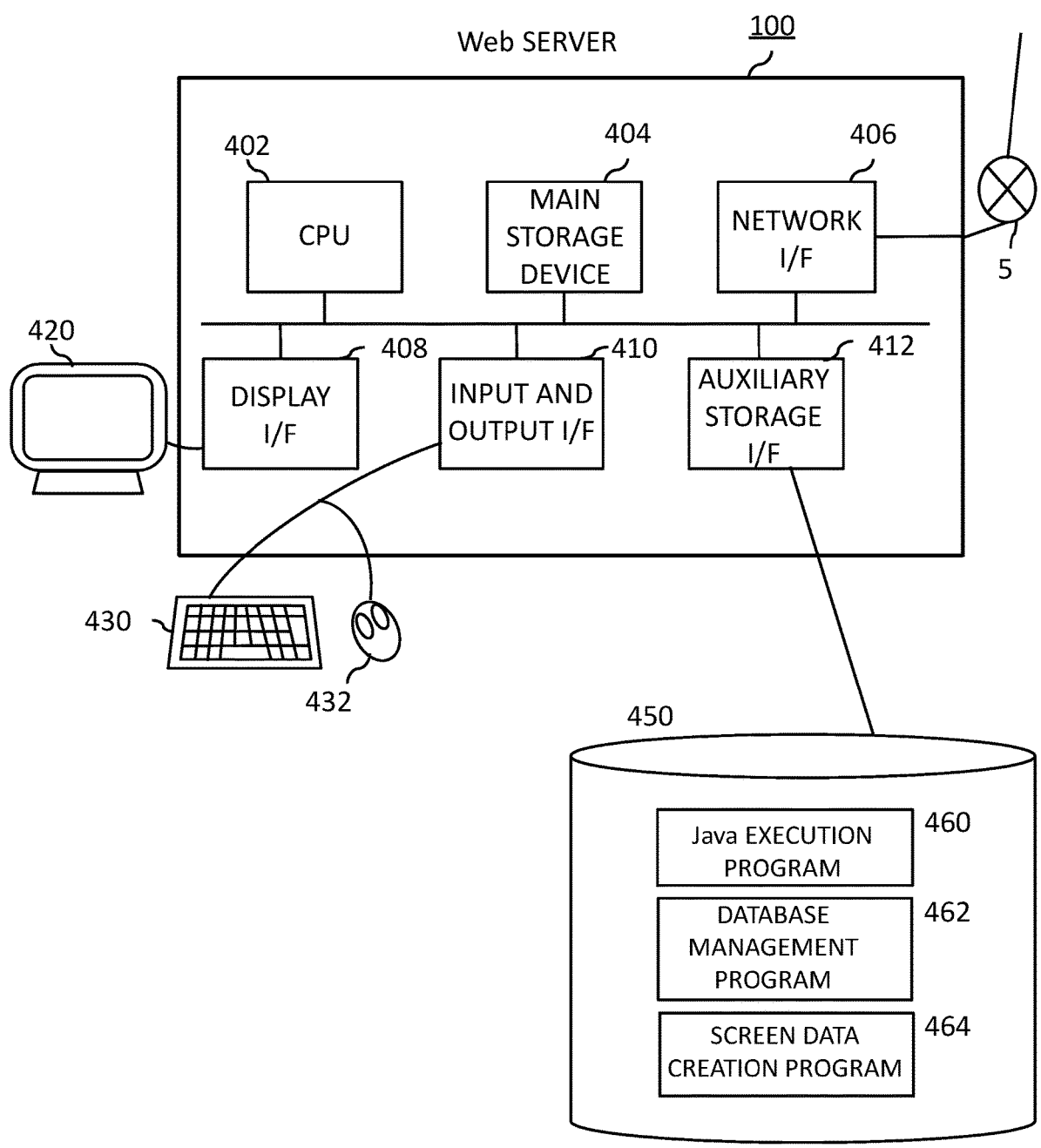
FIG. 2 is a diagram showing the hardware and software configurations of a Web server.

The hardware configuration of the Web server 100 is realized by, for example, a general server apparatus shown in FIG. 2.

The Web server 100 has a form in which a Central Processing Unit (CPU) 402, a main storage device 404, a network I/F 406, a display I/F 408, an input and output I/F 410, and an auxiliary storage I/F 412 are connected to each other by a bus.

The CPU 402 controls each unit of the Web server 100 to load a required program to the main storage device 404 and execute the program.

The main storage device 404 is usually a volatile memory, such as a RAM, and stores a program executed by the CPU 402 and data to be referred to.

The network I/F 406 is an interface for making a connection to the database server 200 and the Web client 300 to each other through the network 5.

The display I/F 408 is an interface for making a connection to a display device 420, such as a Liquid Crystal Display (LCD).

The input and output I/F 410 is an interface for making a connection to input and output devices. In the example of FIG. 2, a keyboard 430 and a mouse 432 as a pointing device are connected.

The auxiliary storage I/F 412 is an interface for making a connection to an auxiliary storage device, such as a Hard Disk Drive (HDD) 450 or a Solid State Drive (SSD).

The HDD 450 has a large storage capacity, and stores a program for executing the present embodiment. A JAVA execution program 460, a database management program 462, and a screen data creation program 464 are installed on the Web server 100. The JAVA execution program 460, the database management program 462, and the screen data creation program 464 are programs for executing the functions of the JAVA execution unit 110, the database management unit 120, and the screen data creation unit 130, respectively.

Next, a concept that is a premise of the application screen display program implementation method of the present embodiment will be described with reference to FIGS. 3 and 4.

Figure 3:
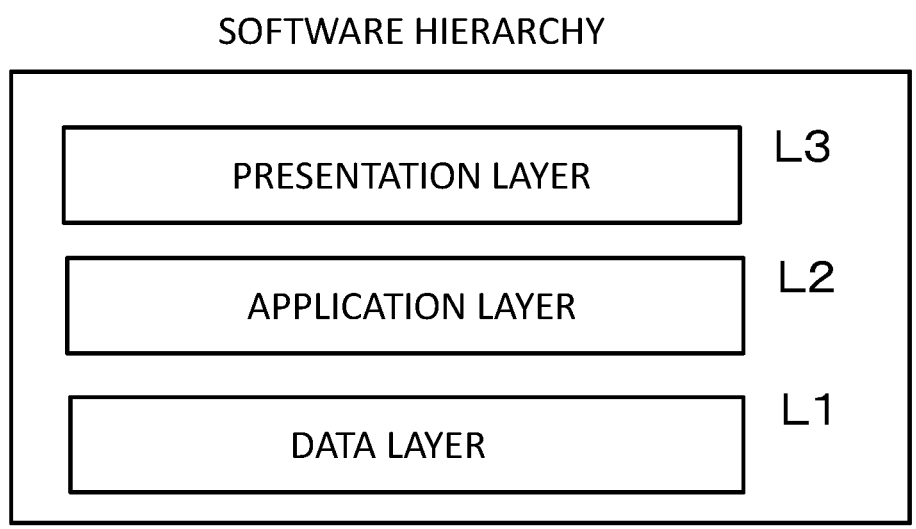
FIG. 3 is a diagram describing a software hierarchy in an application screen display program implementation method.
Figure 4:
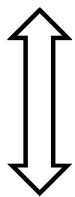
FIG. 4 is a diagram describing a relationship between a table expression and an array index in the application screen display program implementation method.

As shown in FIG. 3, the software hierarchy in the application screen display program implementation method of the present embodiment is premised on a three-layer software hierarchy model including a data layer L1, an application layer L2, and a presentation layer L3.

The data layer L1 is a hierarchy of software that makes descriptions closely related to data. In the present embodiment, this is described as a database table. The application layer L2 is a hierarchy of software that makes descriptions related to the business logic realized by the application. In the present embodiment, the logic is described by JAVA. The presentation layer L3 is a hierarchy of software that describes user interfaces, such as the input and output of a user and screen display. In the present embodiment, this is described by HTML and JSP. In addition, a specific example will be described in detail later.

Next, a relationship between a table expression and an array index in the application screen display program implementation method of the present embodiment will be described with reference to FIG. 4. In the present embodiment, as will be described later, a record of a table having fields of a large heading No., a small heading No., and an item column No. is handled. As shown in FIG. 4, in the code of the program, the data of the record is mapped to the index of the three-dimensional array. For example, when handling the data of a record in which the values of the large heading No., the small heading No., and the item column No. are 1, 0, and 0, respectively, the values of the large heading No., the small heading No., and the item column No. are expressed as, for example, a three-dimensional array ID [1][0][0] in the code of the program. The large heading No., the small heading No., and the item column No. are fields expressing a pattern of a display element of the screen. In addition, the large heading No., the small heading No., and the item column No. will be described in detail later with specific examples.

Next, a relationship between a display screen and data handled in the application screen display program implementation method of the present embodiment will be described with reference to FIGS. 5 and 6.

As the screen layout of the display screen handled in the application screen display program implementation method of the present embodiment, a screen having a three-layer layout is adopted as shown in FIG. 5. That is, a large heading is arranged on the leftmost side, and a small heading is arranged as a sub-item of the large heading. In the example shown in FIG. 5, "large heading 1" and "large heading 2" are arranged in the large heading, and "small heading 11", "small heading 12", and "small heading 13" in the small heading are arranged as subitems of "heading 1" in the large heading. In addition, a text area, a check box, a list box, and a radio button, which are display elements for input and output, are arranged on the left side of the small heading, that is, on the rightmost side. For example, "text area 1" is arranged to the right of "small heading 11", and "check box 1", "check box 2", and "check box 3" are arranged to the right of "small heading 12".

Next, a relationship between display elements and data will be described with reference to FIG. 6.

As described above, in the present embodiment, for example, as shown in FIG. 6, when handling display elements of "large heading 1", "small heading 11", and "text area 1" as having a screen layout of three-layer display elements, it is assumed that 1, 1, and 1 are associated with "heading 1", "small heading 11", and "text area 1", respectively, so that the respective fields of the large heading No., the small heading No., and the item column No. have 1, 1, and 1. In addition, when handling only the large heading No., it is assumed that the lower two are set to 0 so that the respective fields of the large heading No., the small heading No., and the item column No. have 1, 0, and 0. In addition, when handling the large heading No. and the small heading No., it is assumed that the lower one is set to 0 so that the respective fields of the large heading No., the small heading No., and the item column No. have 1, 1, and 0.

In addition, as subitems of the large heading 1 and the small heading 12, check box 1, check box 2, and check box 3 are arranged as display elements. However, all the values of the large heading No., the small heading No., and the item column No. are set to (1, 2, 2).

Next, a data structure relevant to the application screen display program implementation method of the present embodiment will be described with reference to FIGS. 7 to 9.

The display control master table 210 is a master table for defining the presence or absence of display of display elements. As shown in FIG. 7, the display control master table 210 has fields of a tag 210*a*, a large heading 210*b*, a small heading 210*c*, an item column 210*d*, an effective start date 210*e*, an effective end date 210*f*, the number of columns 210*g*, the number of rows 210*h*, and presence or absence of display 210*i*.

In the tag 210*a*, a character indicating the corresponding HTML tag of this display element is stored. In the example shown in FIG. 7, tags "Table", "Tr", "Th", and "Td" expressing HTML table elements are stored. In the large heading 210*b*, the small heading 210*c*, and the item column 210*d*, as described with reference to FIGS. 4 and 6, an index of the array of the source code corresponding to the display element is stored. In the effective start date 210*e* and the effective end date 210*f*, the start date and the end date for treating the display element as valid are stored, respectively. The display control relevant to the effective start date 210*e* and the effective end date 210*f* will be described in detail in the next second embodiment. In the number of columns 210*g* and the number of rows 210*h*, the number of rows and the number of columns of the display element corresponding to the index stored in the large heading 210*b*, the small heading 210*c*, and the item column 210*d* are stored, respectively. The presence or absence of display 210*i* is a flag indicating the presence or absence of display of the display element corresponding to the index stored in the large heading 210*b*, the small heading 210*c*, and the item column 210*d*.

The term control master table 220 is a master table for defining characters (textures) displayed on display elements. As shown in FIG. 8, the term control master table 220 has fields of a type 220*a*, a large heading 220*b*, a small heading 220*c*, an item column 220*d*, an effective start date 220*e*, an effective end date 220*f*, an option code 220G, a selection 220*h*, and a display character 220*i*.

In the type 220*a*, a character string indicating the type of the display element corresponding to the index stored in the large heading 210*b*, the small heading 210*c*, and the item column 210*d* is stored. Here, "EN" indicates a text area, "CB" indicates a check box, "PL" indicates a list box, and "RD" indicates a radio button. In the large heading 220*b*, the small heading 220*c*, and the item column 220*d*, an index of the array of the source code corresponding to the display element is stored, similarly to the description of the large heading 210*b*, the small heading 210*c*, and the item column 210*d* in the display control master table of FIG. 7. In the effective start date 220*e* and the effective end date 220*f*, the start date and the end date for treating the display element as valid are stored, respectively. The option code 220G is a value returned to the application when the corresponding display element is selected. The selection 220*h* is a flag indicating whether or not the corresponding display element is displayed in a state in which the corresponding display element is selected by the selection default. In the display character 220*i*, a character string indicating characters (textures) displayed in the corresponding display element is stored.

The transaction data 230 is data generated as a result of input and output when the application is executed. As shown in FIG. 9, the transaction data 230 has fields of a reception ID 230*a*, a drafting date 230*b*, a large heading 230*c*, a small heading 230*d*, an item column 230*e*, a type 230*f*, and a registered value 230*g*.

In the reception ID 230*a*, an identifier for uniquely identifying the transaction data is stored. In the drafting date 230*b*, the data generation date is stored. In the large heading 230*c*, the small heading 230*d*, and the item column 230*e*, an index of the array of the source code corresponding to the display element in which the transaction data is input is stored. In the type 230*f*, a character string indicating the type of the display element corresponding to the stored index is stored, similarly to the description of the type 220*a* in the display control master table of FIG. 8. The meaning of the character string is the same as that of the type 220*a*. In the registered value 230*g*, a value input from the display element is stored.

Next, the details of the source code relevant to the application screen display program implementation method of the present embodiment will be described with reference to FIGS. 10 and 12.

A source code SC01 in which logic relevant to display is described is a source code for fetching the data stored in the display control master table 210 and the term control master table 220 in association with the array. The source code SC01 belongs to the application layer described with reference to FIG. 3. A source code portion SC01a is a coding portion for fetching information on the presence or absence of display from the display control master table 210. A source code portion SC01b is a coding portion for importing information on display characters from the term control master table 220 and editing the title, heading, and the like to be displayed on the screen. A source code portion SC01c is a portion for editing display elements, such as a list box and a check box to be displayed on the screen.

A source code SC02 in which logic relevant to data is described is a source code for inputting and outputting the data stored in the transaction data 230 in association with the array. The source code SC02 also belongs to the application layer L2 described with reference to FIG. 3.

A source code portion SC02a is a source code for fetching the data stored in the transaction data 230 as variables of the array. On the contrary, a source code portion SC02b is a source code for fetching the contents of the variables of the array to the transaction data 230.

A source code SC03 representing screen data shown in FIG. 12 is a source code described in HTML and JSP for display on the Web browser 310 of the Web client 300. The source code SC03 belongs to the presentation layer described with reference to FIG. 3. In a source code portion SC03a, all the display control variables can be coded in the same format, and the presence or absence of display is determined according to the value of the presence or absence of display 210i in the display control master table 210. A source code portion SC03b is a portion for describing the heading of the screen, and the entirety of this can be coded in the same format. In addition, the wording to be displayed can be set according to the value of the display character 220i in the term control master table 220. A source code portion SC03c is a code relevant to the display of the text area, and the entirety of this can be coded in the same format. That is, the index of the array of the source code may be set to the corresponding numerical value. A source code portion SC03d is a code relevant to the list box, and similarly, the index of the array of the source code may be set to the corresponding numerical value. A source code portion SC03e is coding relevant to the check box.

The coding relevant to the check box will be described in detail in the third embodiment.

Second Embodiment

Hereinafter, an application screen display program implementation method according to a second embodiment will be described with reference to FIGS. 13 to 16.

In the present embodiment, how the display or its operation differs depending on the effective date (effective start date and effective end date) will be described based on the application screen display program implementation method described in the first embodiment.

The configuration of the Web system or the software configuration is the same as that in the first embodiment.

First, a data structure relevant to the application screen display program implementation method of the present embodiment will be described with reference to FIGS. 13 to 16.

The structure and role of the display control master table 210 of the present embodiment are the same as those of the display control master table 210 described with reference to FIG. 7 in the first embodiment.

In the display control master table 210 shown in FIG. 13, the values of the effective start date 210e and the effective end date 210f are different.

That is, the values of the effective start date 210 e and the effective end date 210 f in the display control master table 210 described with reference to FIG. 7 in the first embodiment are "20180401" and "20180930", respectively, whereas the values in the display control master table 210 shown in FIG. 13 of the present embodiment are "20181001" and "20190331", respectively. This indicates that the effective period of the record of the display control master table 210 described with reference to FIG. 7 in the first embodiment is from Apr. 1, 2018 to Sep. 30, 2018 and the effective period of the display control master table 210 shown in FIG. 13 of the present embodiment is from Oct. 1, 2018 to Mar. 31, 2019.

Similarly, in the term control master table 220 of the present embodiment, the values of the effective start date 220e and the effective end date 220f are different.

That is, the values of the effective start date 220 e and the effective end date 220 f in the term control master table 220 described with reference to FIG. 8 in the first embodiment are "20180401" and "20180930", respectively, whereas the values in the term control master table 220 shown in FIG. 14 of the present embodiment are "20181001" and "20190331", respectively. This indicates that the effective period of the record of the term control master table 220 described with reference to FIG. 8 in the first embodiment is from Apr. 1, 2018 to Sep. 30, 2018 and the effective period of the term control master table 220 shown in FIG. 14 of the present embodiment is from Oct. 1, 2018 to Mar. 31, 2019.

The transaction data 230 shown in FIG. 15 of the present embodiment and the transaction data 230 in FIG. 9 of the first embodiment have different values on the drafting date 230b.

The value of the drafting date 230b of the transaction data 230 in FIG. 9 of the first embodiment is included in a period from Apr. 1, 2018 to Sep. 30, 2018, and the value of the transaction data 230 shown in FIG. 15 of the present embodiment is included in a period from Oct. 1, 2018 to Mar. 31, 2019.

In the application screen display program implementation method of the present invention, regarding the handling of the effective period of the records of the display control master table 210 and the term control master table 220, the effective period of the records of the display control master table 210 and the term control master table 220 is set to the value of the drafting date 230b in the transaction data 230 when there is the transaction data 230 corresponding to the item column (display element for input and output) (that is, when the large heading No., the small heading No., and the item column No. match) and set to the date on which the application is started when there is no transaction data 230 corresponding to the item column. In addition, when there is the transaction data 230 corresponding to the display element of the item string, the display element corresponding to the large heading and the small heading having the display element of the item column as a child is set to the value of the drafting date 230b in the transaction data 230.

Therefore, when the transaction data 230 is displayed, it is possible to prevent no screen display of data or prevent a contradiction between the data and the display.

In addition, when switching the work form in a certain period, this becomes possible only by switching the values of the effective start date and the effective end date in the display control master table 210 and the term control master table 220, so that the labor in the work process is reduced.

Next, the screen layout of the display screen in the second embodiment will be described with reference to FIG. 16 in comparison with the first embodiment.

FIG. 16 is a diagram describing the screen layout of the display screen (second one).

When the application is executed to display the screen relevant to the transaction data 230 of FIG. 9 in the first embodiment, the drafting date is included in the period from Apr. 1, 2018 to Sep. 30, 2018, so that the records of the display control master table 210 described with reference to FIG. 7 and the term control master table 220 described with reference to FIG. 8 in the first embodiment are applied and are shown in FIG. 5.

On the other hand, when the application is executed to display the screen relevant to the transaction data 230 shown in FIG. 15, the drafting date is included in the period from Oct. 1, 2018 to Mar. 31, 2019, so that the records of the display control master table 210 described with reference to FIG. 13 and the term control master table 220 described with reference to FIG. 14 in the present embodiment are applied and are shown in FIG. 16.

Third Embodiment

Hereinafter, an application screen display program implementation method according to a third embodiment will be described with reference to FIGS. 17 to 21.

In the present embodiment, an example will be described in which the display of display objects arranged in the item column is changed by changing the term control master table 220.

Also in the present embodiment, the configuration of the Web system or the software configuration is the same as that in the first embodiment.

First, an example of changing the term control master table will be described with reference to FIGS. 17 and 18.

It is assumed that the term control master table 220 shown in FIG. 17 has been updated to the term control master table 220 shown in FIG. 18. That is, new records are added to the term control master table 220 shown in FIG. 18 after the sixth record.

Next, the screen layout of the display screen of the third embodiment will be described with reference to FIGS. 19 and 20.

The screen layout of the display screen when the term control master table 220 in FIG. 17 is applied is shown in FIG. 19. That is, the display character of the check box of (large heading No., small heading No., item string)=(1, 2, 1) is "loquat", the display character of the check box of (large heading No., small heading No., item string)=(1, 2, 2) is "cherry", the display character of the check box of (large heading No., small heading No., item string)=(1, 2, 3) is "none", the display character of the check box of (large heading No., small heading No., item string)=(1, 3, 1) is "caramel", and the display character of the check box of (large heading No., small heading No., item string)=(1, 3, 2) is "chocolate".

Here, it is assumed that a situation occurs in which the period from Oct. 1, 2018 to Mar. 31, 2019 becomes effective while operating the application. That is, an attempt to display the screen is made when the drafting date of the corresponding transaction data 230 is between Oct. 1, 2018 and Mar. 31, 2019, or an attempt to display the screen is made within the period from Oct. 1, 2018 to Mar. 31, 2019 when there is no such transaction data 230.

At that time, the term control master table 220 shown in FIG. 18 is displayed as shown in FIG. 20 because the sixth and subsequent records are effective.

That is, the display character of the check box of (large heading No., small heading No., item string)=(1, 2, 1) is "tangerine", the display character of the check box of (large heading No., small heading No., item string)=(1, 2, 2) is "strawberry", the display character of the check box of (large heading No., small heading No., item string)=(1, 3, 1) is "caramel", the display character of the check box of (large heading No., small heading No., item string)=(1, 3, 2) is "chocolate", the display character of the check box of (large heading No., small heading No., item string)=(1, 3, 3) is "potato chips", and the display character of the check box of (large heading No., small heading No., item string)=(1, 3, 4) is "cookie".

Next, the details of the source code relevant to the application screen display program implementation method of the third embodiment will be described with reference to FIG. 21.

A source code SC04 representing screen data shown in FIG. 21 is also a source code described in HTML and JSP for display on the Web browser 310 of the Web client 300. The source code SC04 also belongs to the presentation layer described with reference to FIG. 3.

In the source code SC04, even if the applied record of the term control master table 220 is changed, there is no need to modify the record.

In particular, when focus is given to a coding portion SC04a portion, this is a loop structure that can meet a situation in which the number of check boxes is variable. That is, the indices in the first and second dimensions of the array may be set to the corresponding numbers, and by repeating the index in the third dimension by the number of records in the corresponding term control master table 220, the check boxes for the number of cases are displayed.

In this manner, even if the specifications are changed during development and the number of display elements is increased or decreased, the variable names are the same, so that the modifications can be easily made.

As described above, the structures of the display control master table 210, the term control master table 220, and the transaction data 230 can be simplified because the index of the array that stores each piece of data is used as a key in the application layer L2.

In addition, since the transaction data 230 is constructed so as to correspond to one record for each display element, data definition and a data definition portion for I/O can be simplified regardless of the number of elements. In addition, since the key for designating data is the index of the array, all items can be designated by loop processing.

Even if there is a specification change during development and a display element change occurs, it is not necessary to change the data layer L1 (display control master table 210 and term control master table 220), so that it is possible to easily respond to the specification change.

In addition, in the application layer L2, the data acquired from the display control master table 210, the term control master table 220, and the transaction data 230 is stored in a three-dimensional array and linked to the presentation layer L3. On the contrary, the input data linked to the presentation layer L3 is edited in the database update area and linked to the data layer L1.

As described above, in the description of the business logic of the application layer L2, the data editing of the master table and the transaction data can be made the same for each type of display element.

Even if there is a specification change during development and a display element change occurs, the application layer L2 does not need to be changed, so that it is possible to easily respond to the specification change.

In the presentation layer, variables for display are coded in the format of array name [ ][ ][ ]. Therefore, it is not necessary to change the variable name for each item, and it is sufficient to designate the corresponding index.

Even if there is a specification change during development and a change in the number of display element items occurs, changes can be easily made because the variable name is the same.

Figure 22:
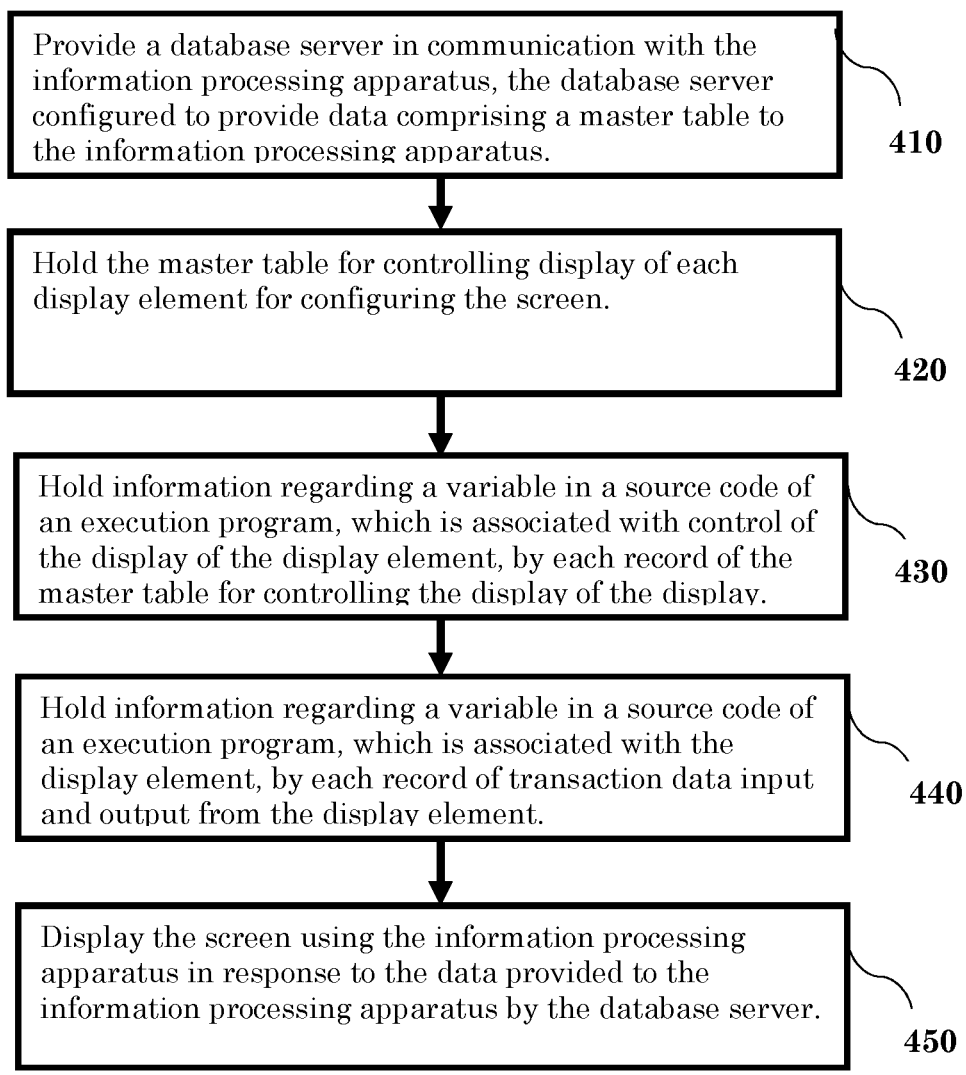
FIG. 22 is a flow diagram showing the steps of an exemplary application screen display program installing method.

Referring to FIG. 22, a flow diagram illustrates the method 400 of executing application software to display a screen using an information processing apparatus. As shown in FIG. 22, the method 400 begins 410 by providing a database server 200 in communication with the information processing apparatus. The database server 200 may be configured to provide data comprising a master table to the information processing apparatus. The method 400 then proceeds 420 with holding the master table for controlling display of each display element for configuring the screen. The method 400 next proceeds 430 with holding information regarding a variable in a source code of an execution program, which is associated with control of the display of the display element, by each record of the master table for controlling the display of the display element. Next, the method 400 continues 440 with holding information regarding a variable in a source code of an execution program, which is associated with the display element, by each record of transaction data input and output from the display element. Finally, the method 400 proceeds to 450 displaying the screen using the information processing apparatus in response to the data provided to the information processing apparatus by the database server.

According to the application screen display program implementation method described in each of the above embodiments, it is possible to reduce the man-hours required for the development and modification of the Web application. That is, it is possible to reduce the development and modification costs, shorten the response time for development and modification, reduce the man-hours for checking the operation after modification, and suppress the occurrence of defects after the modified version is released. Therefore, since even programming beginners can develop and modify Web applications, the effect of expanding the base of programming engineers can be expected.

REFERENCE SIGNS LIST

5 Network
100 Web server
200 Database server
300 Web client
110 JAVA execution unit
120 Database management unit
130 Screen data creation unit
310 Web browser
210 Display control master table
220 Term control master table
230 Transaction data

The invention claimed is:

1. An application screen display program implementation method that improves development and change of a display screen in application development by executing application software to display the screen using an information processing apparatus, comprising:

providing a database server in communication with the information processing apparatus, the database server configured to provide data comprising a master table to the information processing apparatus, holding the master table for controlling display of each display element for display elements configuring the screen;

holding information regarding a variable in a source code of an execution program, which is associated with control of the display of the display element, by each record of the master table for controlling the display of the display element;

holding information regarding a variable in a source code of the execution program, which is associated with the display element, by each record of transaction data input and output from the display element, displaying the screen using the information processing apparatus in response to the data provided to the information processing apparatus by the database server, wherein each record of the master table for controlling the display of the display element and the transaction data input and output from the display element has a field for holding an index of an array, and performing an association of the display element with the index of the array in the source code of the execution program, wherein the master table for controlling the display of the display element has a field for controlling an appearance of the display of the display element.

2. The application screen display program implementation method according to claim 1, wherein a record of the transaction data input and output from the display element and a record of the display element corresponding to transaction data hold an index of a same array.

3. The application screen display program implementation method according to claim 1, wherein the display element has a hierarchy,
the array is a multi-dimensional array, and
the hierarchy of the display element and a dimension of the array are associated with each other.

4. The application screen display program implementation method according to claim 1, wherein each record of the master table for controlling the display of the display element has an effective period, each piece of the transaction data input and output from the display element has a drafting date on which transaction data is updated, and a display element associated with the transaction data is displayed when the drafting date of the transaction data is within the effective period of the record of the master table for controlling the display of the display element.

5. The application screen display program implementation method according to claim 1, wherein the master table for controlling the display of the display element has a field for controlling presence or absence of the display of the display element.

6. The application screen display program implementation method according to claim 1, wherein display elements are selection-type objects forming a same group, and indices of an array of the display elements forming the same group include a common index.

* * * * *